UNITED STATES PATENT OFFICE.

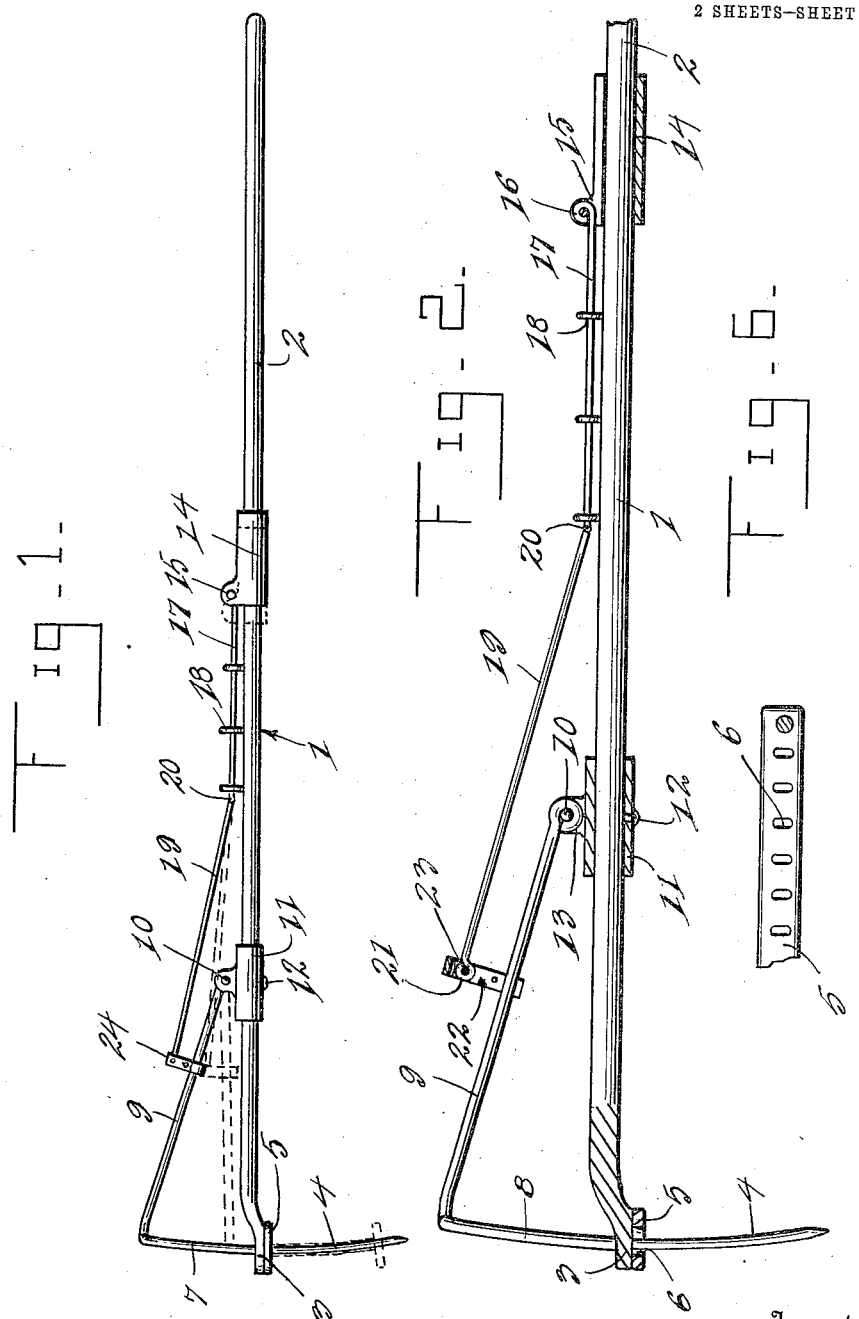
N. T. WHEELER.
RAKE CLEANER.
APPLICATION FILED MAY 26, 1913.
1,070,214.
Patented Aug. 12, 1913.
2 SHEETS—SHEET 1.

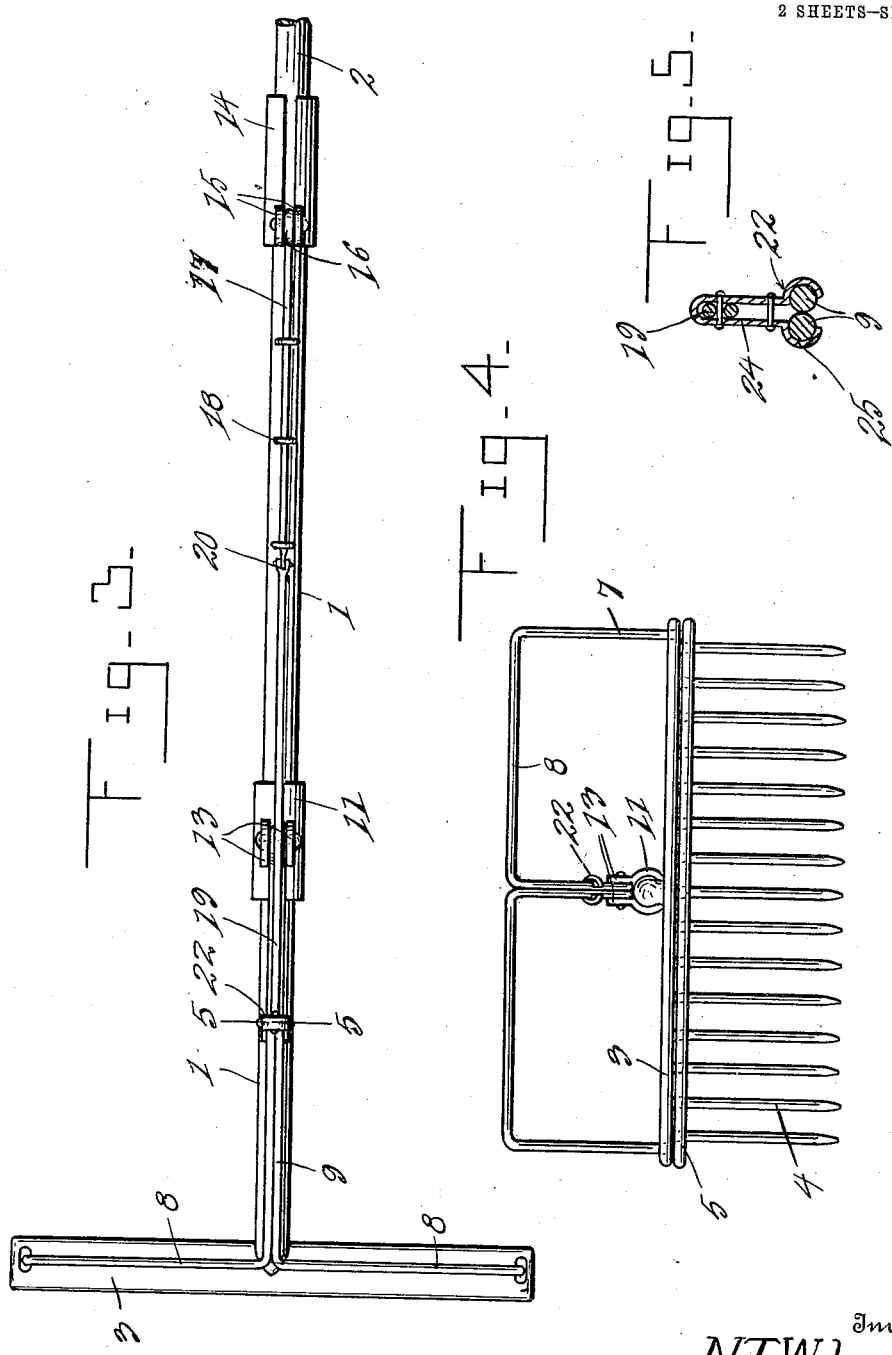

NEWTON T. WHEELER, OF CLEARWATER, KANSAS.

RAKE-CLEANER.

1,070,214.  Specification of Letters Patent.  Patented Aug. 12, 1913.

Application filed May 26, 1913. Serial No. 769,989.

*To all whom it may concern:*

Be it known that I, NEWTON T. WHEELER, a citizen of the United States, residing at Clearwater, in the county of Sedgwick and State of Kansas, have invented certain new and useful Improvements in Rake-Cleaners; and I do hereby declare the following to be a full, clear, and exact description of the invention, such as will enable others skilled in the art to which it appertains to make and use the same.

This invention relates to new and useful improvements in rake cleaners, and has for its object to provide a device of the above character which will effectively strip the teeth of a garden rake of the trash which usually gathers thereon during the process of raking.

Another object of my invention is to provide a device of the above character which may be easily and quickly applied to a rake of ordinary construction, without materially affecting the construction of such rakes.

A still further object of my invention is to provide a device which may be operated from the handle of a rake without the necessity of bending over, which is a considerable inconvenience to the operator.

With the above and other objects in view, I will now proceed to describe my invention in the following specification and accompanying drawings, in which, Figure 1 is a side view of my improved rake cleaner showing the same in position for raking; Fig. 2 is a view partly in section of my improved rake cleaner; Fig. 3 is a top plan view of the same; Fig. 4 is a front view in elevation of my improved rake cleaner; Fig. 5 is a transverse sectional view taken on line 5—5 of Fig. 3; and Fig. 6 is a detail plan view of the stripping plate.

Referring to the drawings by characters of reference, 1 indicates generally a rake of the usual construction comprising a handle 2 and the head 3, this head having secured thereto the usual teeth 4 of any suitable construction.

The rake cleaning attachment preferably comprises the stripping plate 5, having intermediate its side edges the transversely extending slots 6, which are adapted to receive the rake teeth when the device is in position. Secured to the ends of the stripping plate and passing through apertures in the rake head 3, I preferably provide the vertical members 7 which extend upwardly for substantially the same distance as the length of the rake teeth, and then are bent at right angles, as indicated at 8, and extend in a plane parallel with the rake head for substantially half the distance. These members are then bent, as clearly illustrated at 9, and extend parallel with each other for a short distance in a plane with the rake handle, terminating at their rearmost extremity in a loop adapted to receive the pin 10 and pivotally secure the same to the said rake handle. A sleeve 11 is secured to the rake handle by means of a set screw 12, and has extending upwardly therefrom apertured ears 13, which are two in number and are adapted to receive the link formed on the member 9. A slidable sleeve 14 surrounds the rake handle adjacent the extremity opposite the rake head, and is provided at one extremity with the upstanding ears 15 which are adapted to receive a loop 16 formed on the bar 17, which is slidably mounted with relation to the rake handle, and in longitudinal alinement therewith by means of the eyes 18, as clearly shown in Fig. 2. A link 19 is pivotally connected to the bar 17, as clearly shown at 20, and its opposite end has a loop 21 formed thereon, which is pivotally connected to the clamp 22 by means of the pin 23. This clamp 22, shown in detail in Fig. 5, preferably comprises the U-shaped member 24, having formed at the extremities of each of its arms the curved portions 25, which are adapted to receive the members 9 and hold the same firmly together.

It will be obvious from the foregoing that when it is desired to make use of my improved rake cleaning attachment, the same may be easily and quickly applied to a rake of the ordinary type by simply attaching the sleeves in their respective positions, and placing the stripping plate on the teeth, as clearly seen in the drawings. When it is desired to strip the teeth of trash, the only operation necessary is the sliding forward of the sleeve 14, which will cause the bar 17 to slide and, in turn, force the link 19 forward, which will cause the stripping plate 5 to slide downwardly on the rake teeth through the action of the pivotal connection at 23, and thus clean the rake teeth of any trash which may have been gathered thereon. After the teeth have been cleaned, the sleeve 14 is returned to its normal position and it will be obvious that the stripping plate 5 will be brought to its upward position and the rake again ready for use.

While in the foregoing I have shown and described the preferred embodiment of my invention, I wish it to be understood that I may change the specific arrangements of parts without in any way departing from the spirit and scope of my invention.

Having thus fully described my invention what I claim is:

1. In combination with a rake, a cleaner comprising a sleeve slidably mounted on the rake handle, a sleeve secured to said rake handle intermediate the rake head and the aforesaid sleeve, a stripping plate slidably mounted with relation to the rake teeth, bars connected to the stripping plate and extending upwardly therefrom for substantially the length of the rake teeth, said bars being bent at right angles and adapted to extend in a plane parallel with the rake head, said bars being again bent at right angles to extend in a plane parallel with the rake handle, means at the ends of said bars to pivotally connect the same to the fixed sleeve, and a link connecting the bars intermediate their length with the slidable sleeve.

2. In combination with a rake, a cleaner comprising a stripping plate, bars extending upwardly from the terminals of said stripping plate, said bars being bent at right angles and extending in a plane parallel with the rake head, said bars being again bent at a point substantially in the center of the rake head and extending rearwardly therefrom in alinement with the handle of the rake, a sleeve secured to the rake handle, ears extending upwardly from said sleeve, loops formed at the ends of the bars, said loops adapted to be pivotally mounted to the ears, an upstanding member secured intermediate the ends of the bars, a link pivotally secured to the upstanding member, said link extending rearwardly, a sleeve slidable on the rake handle, ears carried by said sleeve, and a slidable bar secured intermediate the ears, the opposite end of said slidable bar being pivotally secured to the rearmost end of the link.

In testimony whereof I affix my signature in presence of two witnesses.

NEWTON T. WHEELER.

Witnesses:
JOHN W. WILLHAM,
JOHN A. WHEELER.

---

Copies of this patent may be obtained for five cents each, by addressing the "Commissioner of Patents, Washington, D. C."